United States Patent [19]

Ross et al.

[11] 4,116,297
[45] Sep. 26, 1978

[54] VEHICLE SEAT LOCK

[76] Inventors: Curtis R. Ross, 3219 Oak Rd., Cleveland Heights, Ohio 44118; Frank R. Ross, 3676 Burbridge Rd., Cleveland Heights, Ohio 44121; Eugene G. Ross, 3579 Concord Dr., Beachwood, Ohio 44122; Gloria R. Winborn, 16804 Gerard Ave., Maple Heights, Ohio 44137

[21] Appl. No.: 803,413

[22] Filed: Jun. 3, 1977

[51] Int. Cl.² .............................................. B60R 25/00
[52] U.S. Cl. ...................................... 180/114; 70/237; 70/261; 297/378
[58] Field of Search .................... 70/237, 238, 261, 14, 70/57; 297/378, 379, 354; 180/114; 292/262, 266, 338, 339

[56] References Cited

U.S. PATENT DOCUMENTS

| 2,643,420 | 6/1953 | Schwartz | 292/262 X |
|---|---|---|---|
| 3,028,198 | 4/1962 | Murr | 297/379 X |
| 3,736,026 | 5/1973 | Ziegler et al. | 297/379 |
| 3,796,072 | 3/1974 | Weeks | 292/266 X |

FOREIGN PATENT DOCUMENTS

| 2,138,984 | 2/1973 | Fed. Rep. of Germany | 70/211 |
|---|---|---|---|
| 428,246 | 5/1935 | United Kingdom | 70/261 |
| 865,204 | 4/1961 | United Kingdom | 70/238 |

Primary Examiner—William H. Schultz
Assistant Examiner—William E. Lyddane
Attorney, Agent, or Firm—Clarence A. O'Brien; Harvey B. Jacobson

[57] ABSTRACT

An elongated lengthwise extendible and retractable brace is provided and equipped with structure for releasably locking the brace against retraction thereof. The brace includes opposite end portions for telescopic engagement with coacting abutment portions of motor vehicle seat cushion and seat back portions which are engageable with each other to limit rearward swinging of the vehicle seat back portion to its operative position in which it is used when the operator of the vehicle is seated in the driver's seat. The seat back portion is forwardly swingable to a position abuttingly engaged with the steering wheel of the vehicle. During forward swinging movement of the seat back portion, the coacting abutment portions of the seat back portion and seat portion which limit rearward swinging of the seat back portion to the operative position are displaced apart. The brace is telescopingly engageable with these abutment portions and lockable against movement to a fully retracted position and thereby prevents swinging movement of the abutment portions of the seat back and seat portions toward each other. In this manner, rearward swinging of the seat back portion from a position abuttingly engaged with the steering wheel of the vehicle is prevented and unauthorized operation of the vehicle is greatly discouraged.

4 Claims, 4 Drawing Figures

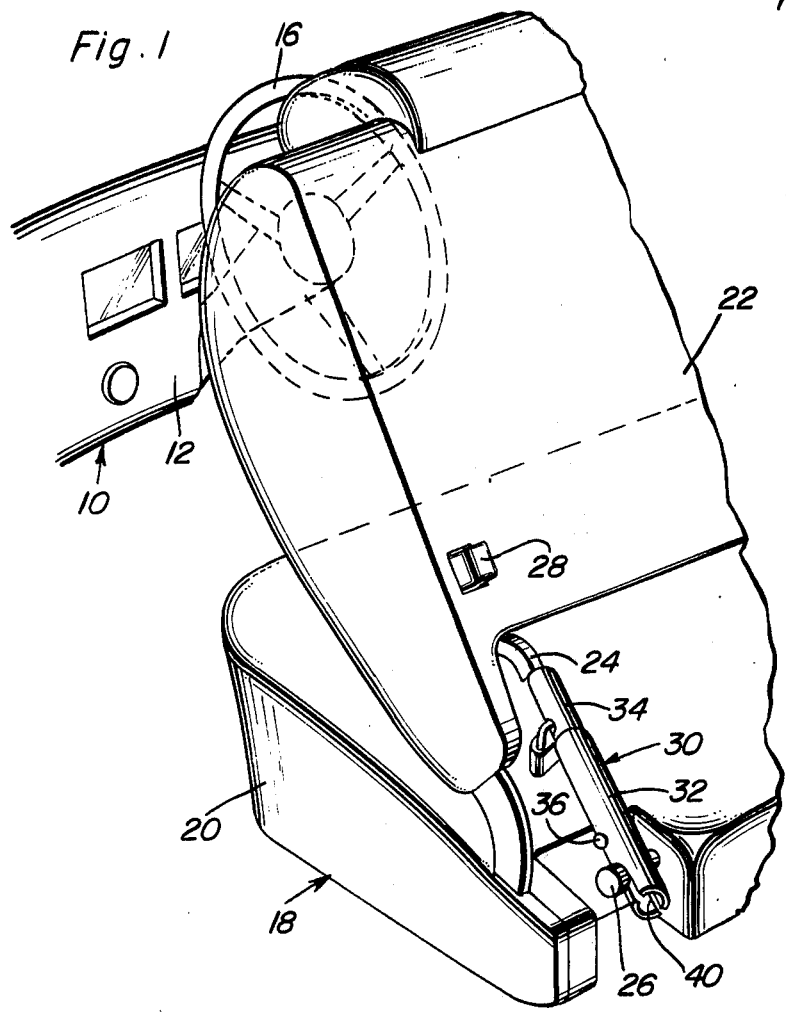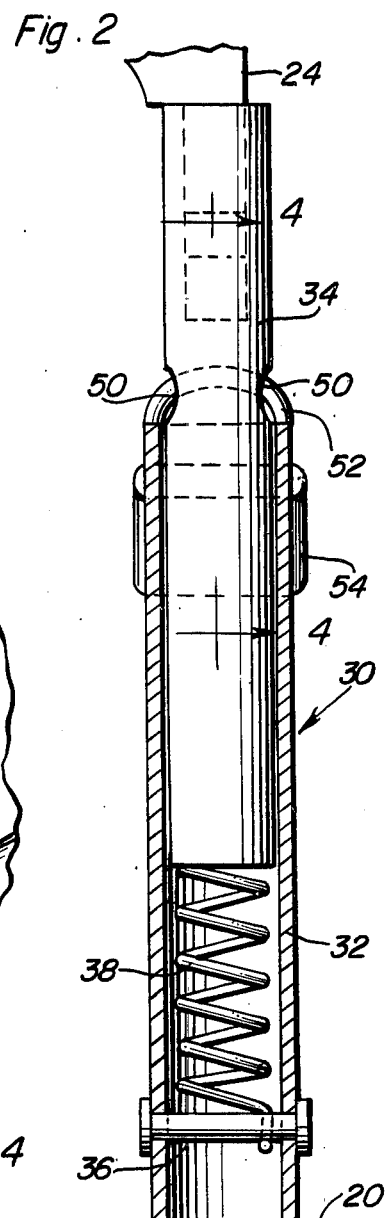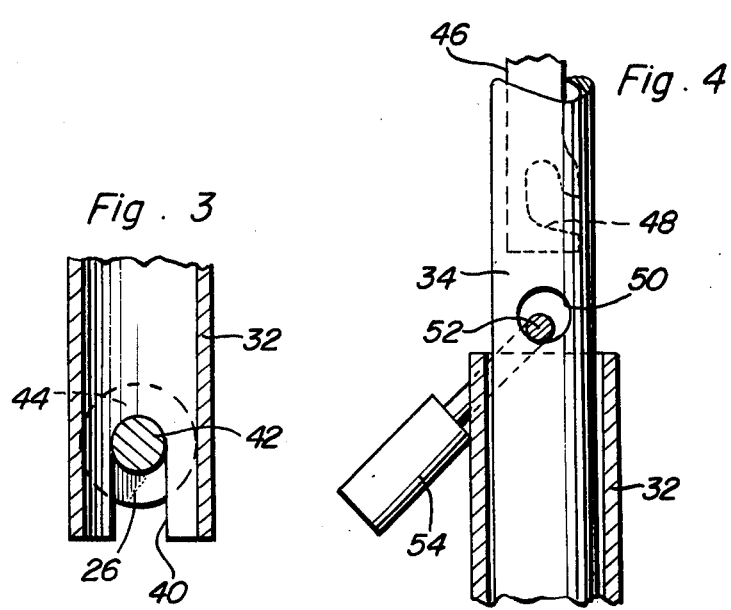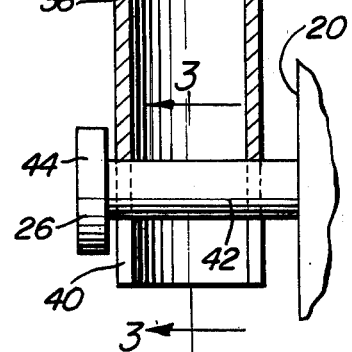

VEHICLE SEAT LOCK

BACKGROUND OF THE INVENTION

In recent years many innovations have been included on motor vehicles to prevent unauthorized use thereof. A majority of motor vehicles presently being produced are equipped with steering wheel locks and other theft preventive devices are available such as hidden fuel line cutoff valves and ignition circuitry deactivating devices. However, steering wheel locks may be broken and fuel line shutoff valves as well as ignition circuit deactivating structures may be bypassed with the result that many presently manufactured motor vehicles may be quite easily operated by unauthorized persons. Accordingly, a need exists for some means by which unauthorized used and theft of a motor vehicle may be seriously discouraged.

Various forms of theft preventive devices for motor vehicles and other locking devices including some of the general structural and operational features of the instant invention are disclosed in U.S. Pat. Nos. 1,617,985, 3,245,239 and 3,777,518.

BRIEF DESCRIPTION OF THE INVENTION

The vehicle seat lock of the instant invention is operative to lock the forwardly swingable seat back portion of a motor vehicle in a fully forwardly displaced position in contact with the steering wheel of the vehicle and thereby severly discourages unauthorized operation of the motor vehicle.

The seat lock comprises an elongated extendible and retractable brace and is equipped with structure whereby the brace may be locked against retraction. The brace is releasably engageable with portions of the seat back and seat cushion of a motor vehicle which are displaced apart during forward swinging movement of the seat back and is thus operative to prevent rearward swinging of the seat back from its maximum forwardly displaced position in contact with the steering wheel of the vehicle.

The main object of this invention is to provide an apparatus whereby unauthorized use of a motor vehicle will be seriously discouraged.

Another object of this invention, in accordance with the preceding object, is to provide a lock assembly which is operative independent of conventional steering wheel locks, hidden gas line shutoff valves and ignition circuitry deactivating structure.

Yet another object of this invention is to provide a lock which may be utilized in conjunction with motor vehicles produced by different motor vehicle manufacturers.

A final object of this invention to be specifically enumerated herein is to provide a vehicle seat lock in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary, perspective view of the interior of a conventional form of motor vehicle whose front seat is provided with a forwardly swingable back rest portion displaceable forwardly from the operative position thereof to a position with the front surface of the seat back portion abuttingly engaged with the steering wheel of the vehicle and with the vehicle seat lock of the instant invention operatively connected between the seat back portion and the seat portion to prevent swinging movement of the seat back portion rearwardly to its operative position;

FIG. 2 is an enlarged, sectional view taken substantially upon a plane passing along the longitudinal center line of the seat lock of FIG. 1;

FIG. 3 is a fragmentary, sectional view taken substantially upon the plane indicated by the section line 3—3 of FIG. 2; and FIG. 4 is a fragmentary, sectional view taken substantially upon the plane indicated by the section line 4—4 of FIG. 2.

DETAILED DESCRIPTION OF THE INVENTION

Referring now more specifically to the drawings, the numeral 10 generally designates a conventional form of motor vehicle, including a forward dashboard 12 and a steering wheel 16. The vehicle 10 further includes a front seat assembly referred to in general by the reference numeral 18 including a seat portion 20 and a back rest portion 22 swingably supported from the seat portion 20. The back rest portion 22 includes an abutment portion 24 and the seat portion 20 includes an abutment portion 26. The portions 24 and 26 are releasably engageable with each other when the seat back portion is swung rearwardly to a rearwardly and upwardly inclined operative position.

The abutment portion 24 is engageable with the abutment portion 26 in a manner to releasably lock the seat back portion 22 against forward swinging movement from the rearwardly and upwardly inclined position and the seat back portion 22 includes a release structure 28 operatively associated with the abutment portion 24 in order to release the latter from latched engagement with the abutment portion 26. Therefore, the release structure 28 may be actuated to release the abutment portion 24 from latched engagement with the abutment portion 26 whenever it is desired to swing the seat back portion 22 from a rearwardly and upwardly inclined operative position to the forwardly and upwardly inclined inoperative position with the front surface of the seat back portion 22 abuttingly engaged with the steering wheel 16.

The foregoing comprises a description of conventional motor vehicle structure presently being manufactured.

The seat lock of the instant invention is referred to in general by the reference numeral 30 and includes a first tube section 32 and a second tube section 34. The tube section 34 is snugly and telescopingly received within one end of the tube section 32 and the latter includes a diametric pin 36 secured therethrough. A compression spring 38 has one end anchored relative to the pin 36 and the other end abuts the adjacent closed end of the tube section 34 whereby the compression spring 38 yieldingly biases the tube section 34 toward an extended position.

The end of the tube section 32 remote from the tube section 34 is provided with an endwise outwardly opening diametric slot 40 and the slotted end of the tube section 32 is engageable over the shank portion 42 of the abutment portion 26 inwardly of the diametrically enlarged head 44 carried by the outer end of the shank portion 42.

The abutment portion 24 comprises an enlongated shank 46 including a laterally opening hook 48 on its free end and the free end portion of the shank 46 is telescopingly receivable within the end of the tube section 34 remote from the tube section 32 in a manner which is believed to be obvious from FIGS. 1, 2 and 4 of the drawings. Further, the tube section 34 includes diametrically opposite radial bores 50 formed therein and the hasp 52 of a padlock 54 may be passed through the bores 50 in order to lock the tube section 34 against retraction relative to the tube section 32.

In operation, when it is desired to lock the seat back portion 22 in the forwardly displaced position thereof abutted against the steering wheel 16 to seriously discourage unauthorized use of the vehicle 10, the seat back portion 22 is first released for forward swinging to the position thereof illustrated in FIG. 1. Then, the hasp 52 of the lock 54 is withdrawn from the bores 50 and the tube section 34 is biased inwardly against the thrust of the spring 38 toward a fully retracted position. Thereafter, the free end of the tube section 34 is telescoped over the shank 46 and the slotted end of the tube section 32 is engaged with the shank portion 42 in the manner illustrated in FIGS. 2 and 4. Thereafter, the tube section 34 is released and the spring 38 biases the tube section 34 toward a fully extended position whereby the seat back portion 22 is urged forwardly into tight abutting engagement with the steering wheel 16. Thereafter, the hasp 52 of the lock 54 is passed through the bores 50 and the lock 54 is locked. In this manner, the abutment portions 24 and 26 are braced against movement toward each other and the seat back portion 22 is thereby locked in the forwardly displaced position abutting and overlying the steering wheel 16 thereby rendering it very difficult for an unauthorized person to operate the vehicle 10.

As hereinbefore set forth, the seat lock 30 may be used in addition to the existing steering wheel lock of the vehicle 10 as well as any other locking devices provided on the vehicle. However, the seat lock 30 is operative independent of other vehicle locking devices and may be readily transferred from one vehicle to another. Further, the lock 30 may be readily manufactured so as to be adaptable for use in conjunction with motor vehicles produced by different manufacturers.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a vehicle interior of the type including an operator's seat construction and a steering control for effecting steerage of the vehicle, said seat construction including a seat portion and a back rest portion supported from the seat portion for swinging between a rearwardly and upwardly inclined operative position and a forwardly and upwardly inclined inoperative position, said steering control being disposed forward of said back rest portion and in position to be engaged by said back rest portion when the latter is swung toward said inoperative position, said seat portion and back rest portion including coacting abutments abuttingly engageable with each other defining the rearward limit of swinging movement of said back rest portion toward said operative position and which are displaced away from each other when said back rest portion is swung from said operative position toward said inoperative position, and telescopic brace means releasably engageable between said abutments when said back rest portion is in said inoperative position and releasably lockable in position therebetween to prevent movement of said abutments toward each other and thus movement of said back rest portion toward said operative position, said brace means including a pair of end overlapped generally parallel elongated members having a first pair of adjacent ends guidingly supported from each other for relative lengthwise shifting of said members and a second pair of remote ends extendable and retractable relative to each other upon relative longitudinal shifting of said members, said second pair of ends and said abutments including releasably telescopingly engaged portions preventing lateral disengagement of said second pair of ends from said abutments, and lock means releasably connected between said elongated members operative to selectively limit lengthwise shifting of said members to relatively retract said second pair of ends.

2. The combination of claim 1 wherein said first pair of ends of said elongated members are relatively telescopingly engaged.

3. The combination of claim 2 wherein said brace member includes means operative to yieldingly bias said elongated members toward relatively shifted positions with said second pair of ends relatively extended.

4. The combination of claim 1 wherein said steering control comprises a rotatable steering wheel disposed in a plane generally normal to its axis of rotation and generally parallel to the forward back engaging surface of said back rest portion when the latter is in said inoperative position.

* * * * *